US008813921B2

(12) United States Patent
Iwai et al.

(10) Patent No.: US 8,813,921 B2
(45) Date of Patent: Aug. 26, 2014

(54) BICYCLE DISC BRAKE ROTOR

(75) Inventors: Toru Iwai, Osaka (JP); Makoto Souwa, Osaka (JP)

(73) Assignee: Shimano Inc., Osaka (JP)

( * ) Notice: Subject to any disclaimer, the term of this patent is extended or adjusted under 35 U.S.C. 154(b) by 67 days.

(21) Appl. No.: 13/304,330

(22) Filed: Nov. 24, 2011

(65) Prior Publication Data
US 2013/0133993 A1  May 30, 2013

(51) Int. Cl.
F16D 65/12  (2006.01)

(52) U.S. Cl.
USPC ..................................... 188/218 XL; 188/26

(58) Field of Classification Search
USPC ............... 188/218 XL, 18 A, 26; 192/113.21, 192/113.22
See application file for complete search history.

(56) References Cited

U.S. PATENT DOCUMENTS

| 2,844,229 | A | * | 7/1958 | Whitfield ................. 188/218 XL |
| 6,119,818 | A | | 9/2000 | Krumbeck et al. |
| 6,290,032 | B1 | * | 9/2001 | Patrick et al. ............ 188/218 XL |
| 6,457,566 | B1 | * | 10/2002 | Toby ........................ 188/1.11 W |
| 6,564,919 | B2 | * | 5/2003 | Diemer et al. ............ 192/107 M |
| 7,284,643 | B1 | * | 10/2007 | Kao ......................... 188/218 XL |
| 7,857,111 | B1 | * | 12/2010 | Moore ..................... 188/218 XL |
| 2003/0178265 | A1 | * | 9/2003 | Chen ........................ 188/218 XL |
| 2004/0035659 | A1 | * | 2/2004 | Pacchiana et al. ......... 188/264 R |
| 2005/0006186 | A1 | | 1/2005 | Iwai et al. |
| 2006/0037819 | A1 | | 2/2006 | Takizawa |
| 2006/0054422 | A1 | * | 3/2006 | Dimsey et al. .................. 188/17 |
| 2008/0302616 | A1 | * | 12/2008 | Kao ......................... 188/218 XL |
| 2011/0240420 | A1 | | 10/2011 | Souwa et al. |
| 2012/0000736 | A1 | | 1/2012 | Koshiyama |
| 2012/0037467 | A1 | * | 2/2012 | Kokott et al. ............ 188/218 XL |

FOREIGN PATENT DOCUMENTS

| DE | 4437160 A1 | * | 4/1996 | |
| EP | 183036 A2 | * | 6/1986 | |
| JP | 56094036 A | * | 7/1981 | ............. F16D 65/84 |
| JP | 2010266020 A | * | 11/2010 | |
| WO | WO 2007043961 A1 | * | 4/2007 | |

* cited by examiner

Primary Examiner — Bradley King
(74) Attorney, Agent, or Firm — Global IP Counselors

(57) ABSTRACT

A bicycle disc brake rotor basically has an outer portion, an inner portion and an intermediate portion. The outer portion is made of a first material. The inner portion is made of the first material. The intermediate portion is disposed between the outer portion and the inner portion. The intermediate portion is made of the first material. The intermediate portion is partially laminated by a layer made of a second material. The second material is different from the first material. The layer has a contour tracing a contour of the intermediate portion.

19 Claims, 3 Drawing Sheets

BICYCLE DISC BRAKE ROTOR

BACKGROUND

1. Field of the Invention

This invention generally relates to a bicycle disc brake rotor. More specifically, the present invention relates to a bicycle disc brake rotor with a configuration that promotes cooling of the braking surfaces.

2. Background Information

In recent years, some bicycles have been provided with disc brakes. Disc brake systems provide a substantial braking power in relationship to the amount of braking force applied to the brake lever. Also, disc brake systems typically provide a high level of consistency in all types of weather and riding conditions. Disc brake systems typically include a caliper housing, a first movable brake pad and a second fixed or movable brake pad. Disc brakes can be hydraulically actuated or mechanically actuated for moving the movable brake pad (s). The brake pads are positioned on either side of a rotor, which is attached to the front or back wheel of a bicycle. The brake pads are pressed against a brake disc or rotor that is fixed to the wheel to slow down or stop the rotation of the disc, and thus, slow down or stop the rotation of the wheel.

SUMMARY

While disc brake systems provide excellent performance, the braking action tends to generate a substantial amount of heat in the disc brake rotor. Thus, one aspect present in this disclosure is to provide a disc brake rotor with a configuration that promotes cooling of the disc brake rotor.

In view of the state of the known technology, a bicycle disc brake rotor is basically provided that comprises an outer portion, an inner portion and an intermediate portion. The outer portion is made of a first material. The inner portion is made of the first material. The intermediate portion is disposed between the outer portion and the inner portion. The intermediate portion is made of the first material. The intermediate portion is partially laminated by a layer made of a second material. The second material is different from the first material. The layer has a contour tracing a contour of the intermediate portion.

These and other objects, features, aspects and advantages of the disclosed bicycle disc brake rotor will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
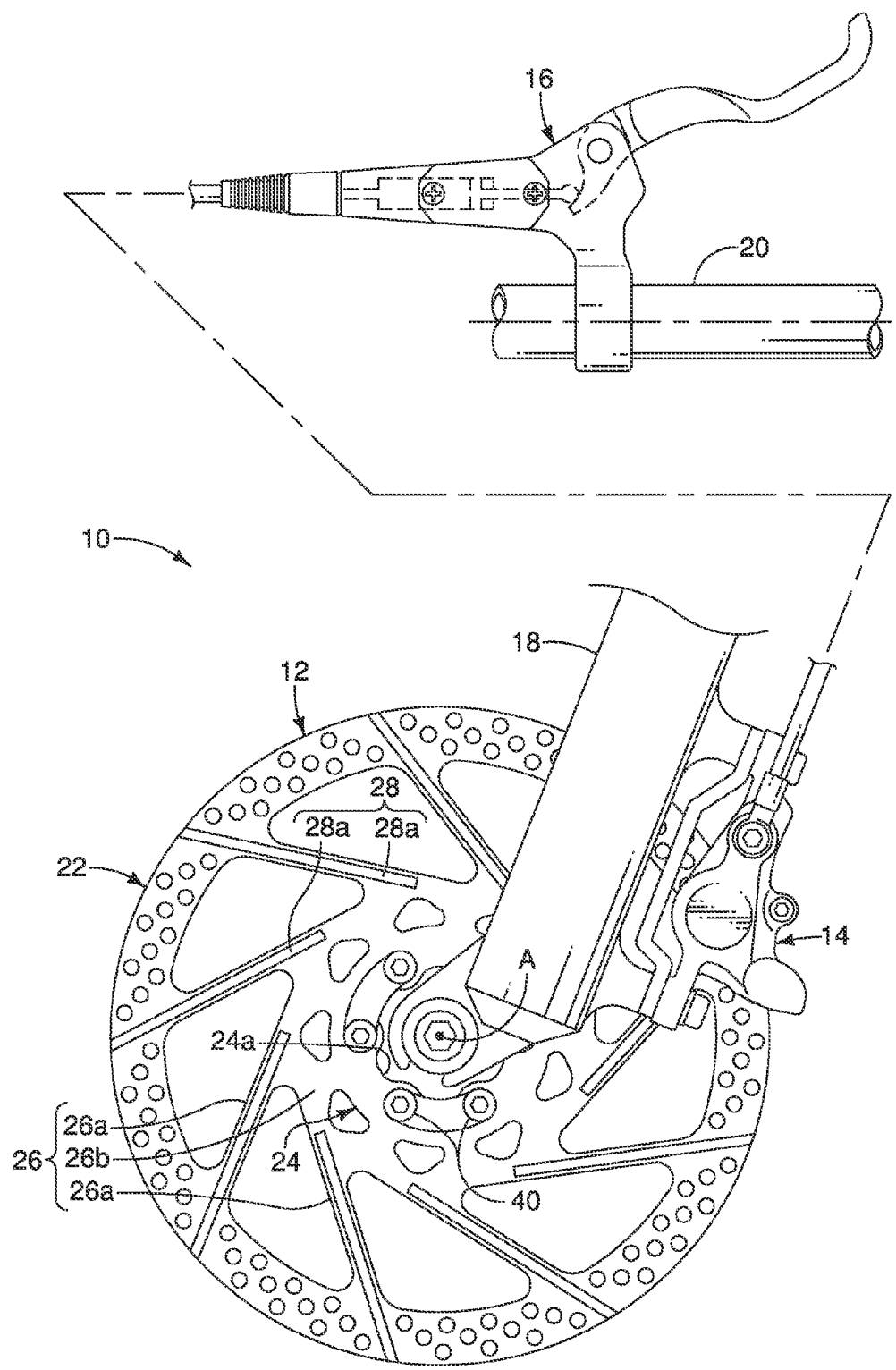
FIG. 1 is a side elevational view of a front disc brake system including a bicycle disc brake rotor in accordance with a first embodiment.

Referring initially to FIG. 1, a front disc brake system 10 is illustrated that includes a bicycle disc brake rotor 12 in accordance with a first embodiment. As explained below, the bicycle disc brake rotor 12 has a configuration that promotes cooling of the bicycle disc brake rotor 12. The front disc brake system 10 further includes a bicycle disc brake caliper 14 and a brake operating (actuating) mechanism 16. Basically, the bicycle disc brake rotor 12 is fixedly attached to a hub (not shown) of a bicycle wheel (not shown). The bicycle disc brake caliper 14 is mounted to a bicycle fork 18, while brake operating mechanism 16 is attached to a bicycle handlebar 20. Since the operation and construction of the front disc brake system 10 is conventional, except for the construction of the bicycle disc brake rotor 12, the front disc brake system 10 will not be discussed or shown in further detail herein. Moreover, while the front disc brake system 10 is illustrated as a hydraulic braking system, the bicycle disc brake rotor 12 can be used with other types of braking systems as needed and/or desired.

The disc brake caliper 14 is constructed for selectively gripping (stopping rotation) of the bicycle disc brake rotor 12 to stop or slow the rotation of a bicycle wheel (not shown). During this braking operation, heat is generated that is transferred to the bicycle disc brake rotor 12 and the bicycle disc brake caliper 14. As explained below, the bicycle disc brake rotor 12 is designed to dissipate the heat generated during braking.

Figure 2:
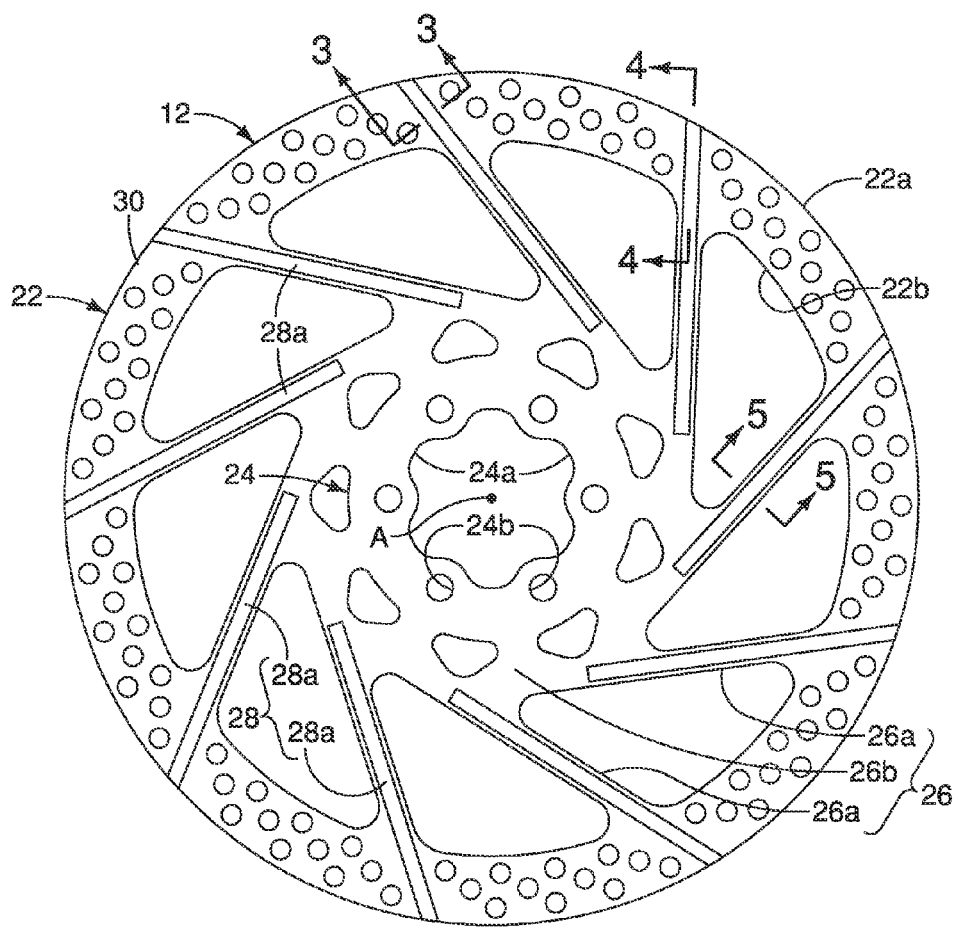
FIG. 2 is a side elevational view of the bicycle disc brake rotor illustrated in FIG. 1.

Referring now to FIG. 2, the bicycle disc brake rotor 12 basically has an outer portion 22, an inner portion 24 and an intermediate portion 26. The intermediate portion 26 is disposed between the outer and inner portions 22 and 24, and interconnects the outer and inner portions 22 and 24 together. At least the intermediate portion 26 is at least partially laminated by a layer 28 that is designed to promote cooling of the bicycle disc brake rotor 12. In this first embodiment, the layer 28 extends along sections of the outer portion 22 and the intermediate portion 26. The layer 28 is preferably at least a thermally sprayed layer that is bonded to the outer portion 22 and the intermediate portion 26 by a cold spraying process. The layer 28 has a contour that at least traces a contour of the outer portion 22 and a contour of the intermediate portion 26.

In the first illustrated embodiment, the inner portion 24 is integrally formed at the intermediate portion 26 as a one-piece member. The inner portion 24 includes an opening 24a for accommodating a hub axle therethrough, and a plurality of hub mounting holes 24b that are arranged circumferentially about a center rotational axis A of the bicycle disc brake rotor 12. The inner portion 24 constitutes a hub mounting portion that is mounted to a bicycle hub by a plurality of bolts 40 as seen in FIG. 1. Thus, the bicycle disc brake rotor 12 rotates with the bicycle hub about the center rotational axis A.

In the first embodiment, the outer portion 22, the inner portion 24 and the intermediate portion 26 are integrally formed as a one-piece member of a suitable first material such as stainless steel. The layer 28 is made of a second material (e.g., copper) that is different from the first material (e.g., stainless steel). Preferably, the material of the layer 28 has a higher thermal conductivity than the material of the outer portion 22. Here in the first embodiment, the intermediate portion 26 includes of a plurality of connecting arms 26a with the inner ends of the connecting arms 26a connected together by a ring shaped joining portion 26b. The outer ends of the connecting arms 26a are coupled to the outer portion 22.

Since the intermediate portion 26 is formed with the connecting arms 26a, the layer 28 is also formed with a plurality thermally sprayed layer portions 28a and 28b by a cold spraying process. The thermally sprayed layer portions 28a are thermally sprayed layers that are laminated to a first axial face of each of the connecting arms 26a of the intermediate portion 26. The thermally sprayed layer portions 28b are thermally sprayed layers that are laminated to a second axial face of each of the connecting arms 26a of the intermediate portion 26.

Figures 3, 4:
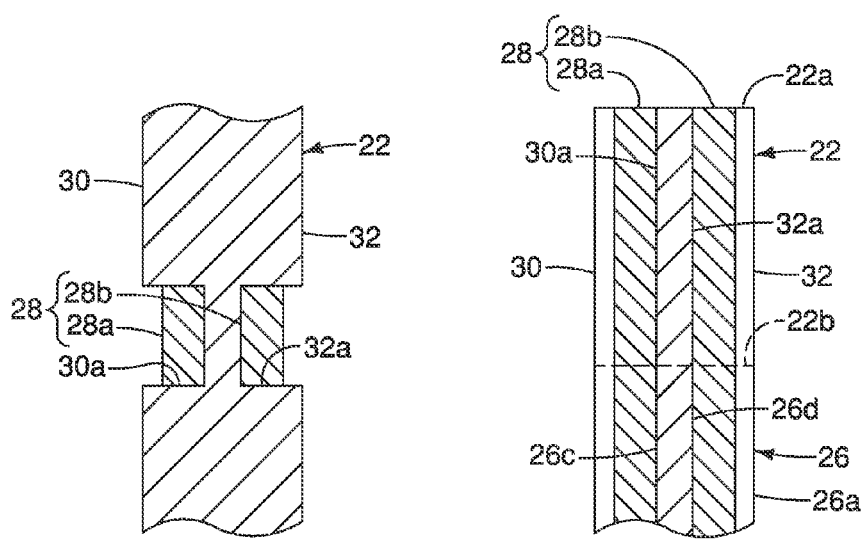
FIG. 3 is a cross sectional view of the bicycle disc brake rotor illustrated in FIGS. 1 and 2 as seen along section line 3-3 of FIG. 2.
FIG. 4 is a cross sectional view of the bicycle disc brake rotor illustrated in FIGS. 1 and 2 as seen along section line 4-4 of FIG. 2.
Figure 5:
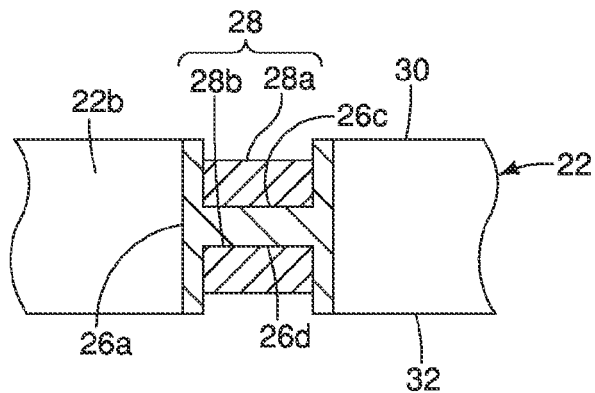
FIG. 5 is a cross sectional view of the bicycle disc brake rotor illustrated in FIGS. 1 and 2 as seen along section line 5-5 of FIG. 2.

While the outer portion 22 is illustrated as being integral with the intermediate portion 26, it will be apparent that the outer portion 22 could be provided with one or more attachment structures such that the outer portion 22 and the intermediate portion 26 are separate parts that are attached together. In both cases, preferably, the outer portion 22 and the intermediate portion 26 are made of the same (first) material. In this first embodiment, the outer portion 22 is an outer annular or ring-shaped portion that defines a pair of friction braking surfaces 30 and 32. The braking surface 30 preferably has a plurality of recesses 30a. Similarly, the braking surface 32 preferably has a plurality of recesses 32a. The recesses 30a and 32a extend from an outer peripheral edge 22a of the outer portion 22 to an inner peripheral edge 22b of the outer portion 22. More preferably, these recesses 30a and 32a extend from an outer peripheral edge 22a of the outer portion 22 to the joining portion 26b. As seen in FIGS. 3 and 4, these recesses 30a and 32a are laminated with the thermally sprayed layer portions 28a and 28b by a cold spraying process. Preferably, the exterior surfaces of the thermally sprayed layer portions 28a and 28b are recessed from the friction braking surfaces 30 and 32. In other words, the thermally sprayed layer portions 28a and 28b are recessed within the recesses 30a and 32a with respect to a corresponding one of the friction braking surfaces 30 and 32.

Figure 6:
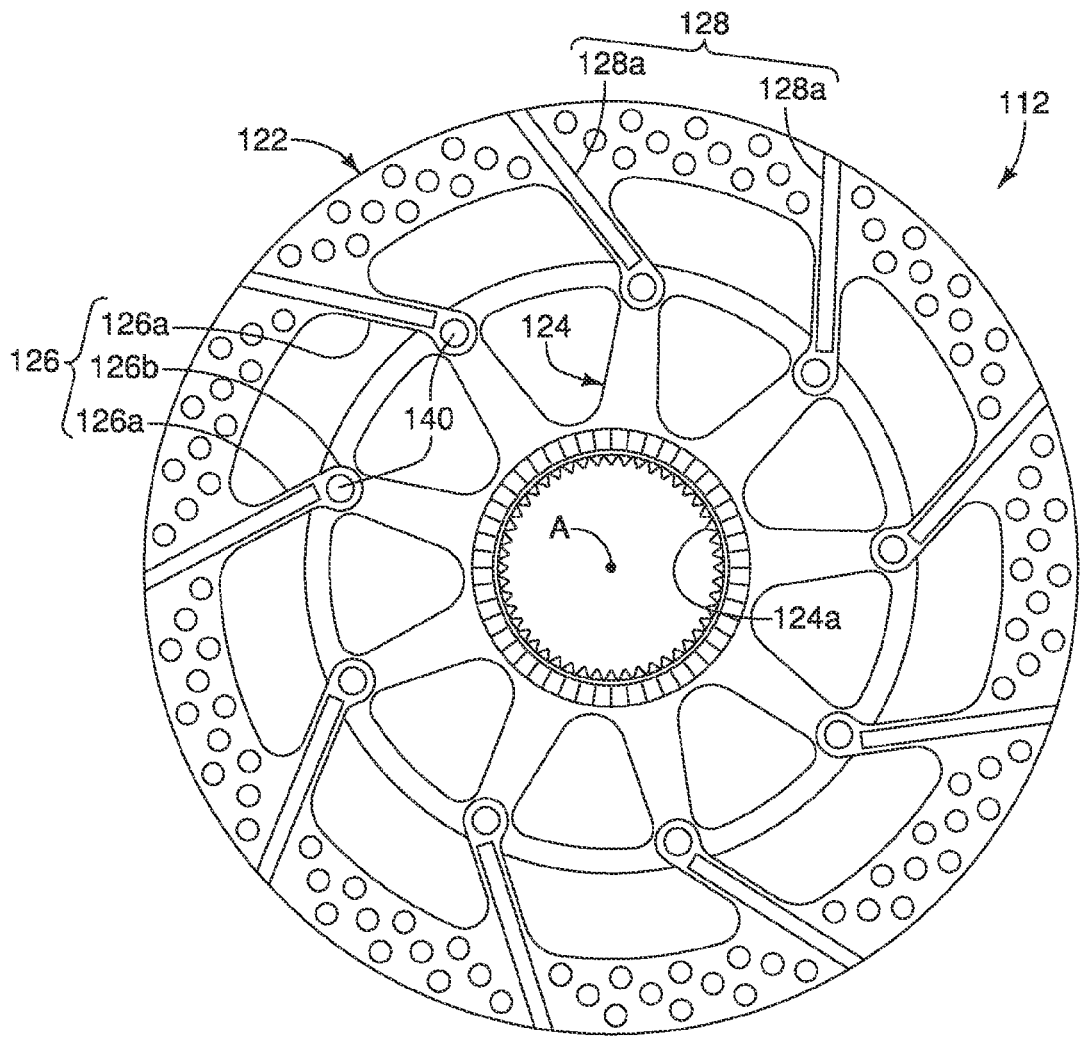
FIG. 6 is a side elevational view of a bicycle disc brake rotor in accordance with a second embodiment.

Referring now to FIG. 6, a bicycle disc brake rotor 112 in accordance with a second embodiment will now be explained. The bicycle disc brake rotor 112 basically has an outer portion 122, an inner portion 124 and an intermediate portion 126. The intermediate portion 126 is disposed between the outer portion 122 and the inner portion 124 and interconnects the outer portion 122 and the inner portion 124 together. The outer portion 122 and the intermediate portion 126 are integrally formed as a one-piece member of the first material. The inner portion 124 is a separate member that is fixed to the inner end of the intermediate portion 126 by fasteners such as the rivets 140 as illustrated. The inner portion 124 has a hub mounting opening 124a that has a plurality of serrations.

The layer 128 is made of a second material (e.g., copper) that is different from the first material (e.g., stainless steel). Preferably, the material of the layer 128 has a higher thermal conductivity than the material of the outer portion 122. Here in the second embodiment, the intermediate portion 126 includes of a plurality of connecting arms 126a with each of the connecting arms 126a having an attachment portion 126b at its inner free end. Thus, the layer 128 is formed of a plurality individual layer portions 128a. The thermally sprayed layer portions 128a are thermally sprayed layers that are bonded to each axial face of each of the connecting arms 126a of the intermediate portion 126. In view of the similarities between the bicycle disc brake rotors 12 and 112, the bicycle disc brake rotor 112 will not be discussed in great detail herein.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle disc brake rotor comprising:
   an outer portion made of a first material and comprising an annular portion defining a pair of friction braking surfaces, the outer portion including at least one recess formed in at least one of the friction braking surfaces defined by the annular portion;
   an inner portion made of the first material; and
   an intermediate portion disposed between the outer portion and the inner portion, the intermediate portion being made of the first material;
   the intermediate portion being at least partially laminated by a layer made of a second material, the second material being different from the first material, the layer having a contour tracing a contour of the intermediate portion with at least a portion of the layer being arranged within the at least one recess such that the layer does not form a part of the friction braking surfaces.

2. The bicycle disc brake rotor according to claim 1, wherein
   the layer is a copper layer.

3. The bicycle disc brake rotor according to claim 1, wherein
   the outer portion and the intermediate portion are integrally formed as a one-piece member of the first material.

4. The bicycle disc brake rotor according to claim 3, wherein
   the inner portion is a separate member that is fixed to the inner end of the intermediate portion.

5. The bicycle disc brake rotor according to claim 1, wherein
   the outer portion, the intermediate portion and the inner portion are integrally formed as a one-piece member of the first material.

6. The bicycle disk brake rotor according to claim 2, wherein
   the copper layer is bonded to the at least one of the intermediate portion by a cold spraying process.

7. A bicycle disc brake rotor comprising:
   an outer portion made of a first material and comprising an annular portion defining a pair of friction braking surfaces the outer portion including at least one recess formed in at least one of the friction braking surfaces defined by the annular portion;

an inner portion made of the first material; and an intermediate portion disposed between the outer portion and the inner portion, the intermediate portion being made of the first material;

the intermediate portion being at least partially laminated by a thermally sprayed layer provided by a thermal spray, the thermally sprayed layer being made of a second material that is different from the first material, the thermally sprayed layer having a contour tracing a contour of the intermediate portion and being arranged such that the thermally sprayed layer does not form a part of the friction braking surfaces, the at least one recess including the thermally sprayed layer disposed therein.

8. The bicycle disc brake rotor according to claim 7, wherein
the thermally sprayed layer is recessed within the at least one recess with respect to the at least one of the friction braking surfaces that includes the at least one recess.

9. The bicycle disc brake rotor according to claim 7, wherein
the intermediate portion includes a recess with the thermally sprayed layer disposed therein.

10. The bicycle disc brake rotor according to claim 7, wherein
the intermediate portion includes a plurality of connecting arms, and the thermally sprayed layer extends along at least one axial face of at least one of the connecting arms.

11. The bicycle disc brake rotor according to claim 10, wherein
the thermally sprayed layer extends along the at least one axial face of all of the connecting arms.

12. The bicycle disc brake rotor according to claim 10, wherein
the at least one of the connecting arms includes a recess with the thermally sprayed layer disposed therein.

13. A bicycle disc brake rotor comprising:
an outer portion made of a first material and comprising an annular portion defining a pair of friction braking surfaces;
an inner portion made of the first material; and
an intermediate portion disposed between the outer portion and the inner portion, the intermediate portion being made of the first material;
the intermediate portion being at least partially laminated along opposite axial faces of the intermediate portion by a thermally sprayed layer provided by a thermal spray, the thermally sprayed layer being made of a second material that is different from the first material, the thermally sprayed layer having a contour tracing a contour of the intermediate portion and being arranged such that the thermally sprayed layer does not form a part of the friction braking surfaces.

14. The bicycle disc brake rotor according to claim 13, wherein
the outer portion includes at least one recess formed in each one of the friction braking surfaces defined by oppositely facing sides of the annular portion, the recesses including the thermally sprayed layer disposed therein.

15. The bicycle disc brake rotor according to claim 14, wherein
the thermally sprayed layer is recessed within the recesses with respect to a corresponding one of the friction braking surfaces that includes a corresponding one of the recesses.

16. A bicycle disc brake rotor comprising:
an outer portion made of a first material and comprising an annular portion defining a pair of friction braking surfaces;
an inner portion made of the first material; and
an intermediate portion disposed between the outer portion and the inner portion, the intermediate portion being made of the first material;
the outer portion and the intermediate portion being integrally formed as a one-piece member of the first material,
the outer portion including at least one recess formed in at least one of the friction braking surfaces defined by the annular portion, the at least one recess extending from an outer peripheral edge of the outer portion to an inner peripheral edge of the intermediate portion,
the intermediate portion being at least partially laminated by a layer made of a second material that is different from the first material, the layer having a contour tracing a contour of the intermediate portion and being disposed within the at least one recess such that the layer is recessed with respect to the at least one of the friction braking surfaces that includes the at least one recess and does not form a part of the friction braking surfaces.

17. A bicycle disc brake rotor comprising:
an outer portion made of a first material and comprising an annular portion defining a pair of friction braking surfaces;
an inner portion made of the first material; and
an intermediate portion disposed between the outer portion and the inner portion; the intermediate portion being made of the first material;
the outer portion and the intermediate portion being integrally formed as a one-piece member of the first material, and the inner portion being a separate member that is fixed to the inner end of the intermediate portion,
the outer portion including at least one recess formed in at least one of the friction braking surfaces formed by the outer portion, the at least one recess extending from an outer peripheral edge of the outer portion to an inner peripheral edge of the intermediate portion,
the intermediate portion being at least partially laminated by a layer made of a second material that is different from the first material, the layer having a contour tracing a contour of the intermediate portion and being disposed within the at least one recess such that the layer is recessed with respect to the at least one of the friction braking surfaces that includes the at least one recess and does not form a part of the friction braking surfaces.

18. A bicycle disc brake rotor comprising:
an outer portion made of a first material and comprising an annular portion defining a pair of friction braking surfaces;
an inner portion made of the first material; and
an intermediate portion disposed between the outer portion and the inner portion, the intermediate portion being made of the first material and including a plurality of connecting arms;
the outer portion and the intermediate portion being integrally formed as a one-piece member of the first material,
a recess being provided in each of opposite axial faces of each of the connecting arms, the recess extending from an inner peripheral edge of the intermediate portion to an outer peripheral edge of the outer portion,
the intermediate portion being at least partially laminated by a layer made of a second material that is different from the first material, the layer having a contour tracing a contour of the intermediate portion and being disposed within the recesses such that the layer is recessed within each of the recesses with respect to the friction braking surface that includes the recess and does not form a part of the friction braking surfaces.

19. A bicycle disc brake rotor comprising:

an outer portion made of a first material and comprising an annular portion defining a pair of friction braking surfaces;

an inner portion made of the first material; and an intermediate portion disposed between the outer portion and the inner portion, the intermediate portion being made of the first material and including a plurality of connecting arms;

the outer portion and the intermediate portion being integrally formed as a one-piece member of the first material, and the inner portion being a separate member that is fixed to the inner end of the intermediate portion, a recess being provided in each of opposite axial faces of each of the connecting arms, the recess extending from an inner peripheral edge of the intermediate portion to an outer peripheral edge of the outer portion, the intermediate portion being at least partially laminated by a layer made of a second material that is different from the first material, the layer having a contour tracing a contour of the intermediate portion and being disposed within the recesses such that the layer is recessed within each of the recesses with respect to the friction braking surface that includes the recess and does not form a part of the friction braking surfaces.

* * * * *